United States Patent
Xiang

(10) Patent No.: US 11,958,234 B2
(45) Date of Patent: Apr. 16, 2024

(54) THREE-DIMENSIONAL OBJECT INKJET PRINTING METHOD, PRINTING APPARATUS AND COMPUTER-READABLE STORAGE MEDIUM

(71) Applicant: ZHUHAI SAILNER 3D TECHNOLOGY CO., LTD., Zhuhai (CN)

(72) Inventor: Dongqing Xiang, Zhuhai (CN)

(73) Assignee: ZHUHAI SAILNER 3D TECHNOLOGY CO., LTD., Zhuhai (CN)

( * ) Notice: Subject to any disclaimer, the term of this patent is extended or adjusted under 35 U.S.C. 154(b) by 348 days.

(21) Appl. No.: 17/238,093

(22) Filed: Apr. 22, 2021

(65) Prior Publication Data
US 2021/0237341 A1    Aug. 5, 2021

Related U.S. Application Data

(63) Continuation of application No. PCT/CN2019/088358, filed on May 24, 2019.

(30) Foreign Application Priority Data

Dec. 13, 2018    (CN) .......................... 201811528233.3

(51) Int. Cl.
*B29C 64/112*    (2017.01)
*B29C 64/209*    (2017.01)
(Continued)

(52) U.S. Cl.
CPC .......... *B29C 64/112* (2017.08); *B29C 64/209* (2017.08); *B29C 64/245* (2017.08);
(Continued)

(58) Field of Classification Search
CPC ... B29C 64/112; B29C 64/245; B29C 64/209; B29C 64/393; B29C 64/40; B33Y 10/00; B33Y 30/00; B33Y 50/02
(Continued)

(56) References Cited

U.S. PATENT DOCUMENTS

| | | | |
|---|---|---|---|
| 2006/0054039 A1* | 3/2006 | Kritchman | B33Y 40/00 427/256 |
| 2016/0039152 A1* | 2/2016 | Hara | B33Y 30/00 425/375 |
| 2017/0368749 A1 | 12/2017 | Pilegaard | |
| 2018/0207863 A1* | 7/2018 | Porter | B29C 64/40 |

FOREIGN PATENT DOCUMENTS

| | | |
|---|---|---|
| CN | 107521105 A | 12/2017 |
| CN | 206856009 U | 1/2018 |

(Continued)

OTHER PUBLICATIONS

International Search Report for PCT/CN2019/088358.
The first Office Action of the priority CN application.
First Office Action of the parallel JP application.

*Primary Examiner* — Nahida Sultana
*Assistant Examiner* — Lawrence D. Hohenbrink, Jr.
(74) *Attorney, Agent, or Firm* — J.C. PATENTS

(57) ABSTRACT

Provided are a three-dimensional object inkjet printing method, a printing apparatus and a computer-readable storage medium. Where the three-dimensional object inkjet printing method includes: forming an adhesion support portion (2) on a support platform (1) first, and then forming an elastic support portion (3) on the adhesion support portion, the elastic support portion being embedded with a first elastic portion (31), and finally, forming a target object (4) by printing layer by layer on the elastic support portion. Therefore, a possibility of affecting a printing precision due to a separation of a material layer and the support platform is reduced, and a possibility of cracking in a bottom of the (Continued)

support when subjected to an impact force during an inkjet printing process is reduced at the same time, and a printing reliability is improved.

25 Claims, 10 Drawing Sheets

(51) Int. Cl.
*B29C 64/245* (2017.01)
*B29C 64/393* (2017.01)
*B29C 64/40* (2017.01)
*B33Y 10/00* (2015.01)
*B33Y 30/00* (2015.01)
*B33Y 50/02* (2015.01)

(52) U.S. Cl.
CPC ............ *B29C 64/393* (2017.08); *B29C 64/40* (2017.08); *B33Y 10/00* (2014.12); *B33Y 30/00* (2014.12); *B33Y 50/02* (2014.12)

(58) Field of Classification Search
USPC .......................................................... 264/308
See application file for complete search history.

(56) References Cited

FOREIGN PATENT DOCUMENTS

| | | |
|---|---|---|
| CN | 206884186 U | 1/2018 |
| CN | 207105623 U | 3/2018 |
| CN | 107953561 A | 4/2018 |
| CN | 207224597 U | 4/2018 |
| CN | 208027035 U | 10/2018 |
| CN | 109435489 A | 3/2019 |
| JP | 2016026915 A | 2/2016 |
| JP | 2016037040 A | 3/2016 |
| JP | 2016043610 A | 4/2016 |
| JP | 2018034350 A | 3/2018 |
| JP | 2018144262 A | 9/2018 |

* cited by examiner

THREE-DIMENSIONAL OBJECT INKJET PRINTING METHOD, PRINTING APPARATUS AND COMPUTER-READABLE STORAGE MEDIUM

CROSS-REFERENCE TO RELATED APPLICATIONS

This application is a continuation of International Application No. PCT/CN2019/088358, filed on May 24, 2019, which claims priority to Chinese Patent Application No. 201811528233.3, filed with the China National Intellectual Property Administration on Dec. 13, 2018, titled "Three-dimensional object inkjet printing method, printing apparatus and computer-readable storage medium", with applicant being Zhuhai Sailner 3D Technology Co., Ltd, all of which are hereby incorporated by reference in their entireties.

TECHNICAL FIELD

The present disclosure relates to three-dimensional molding technology, and in particular, to a three-dimensional object inkjet printing method, a printing apparatus and a computer-readable storage medium.

BACKGROUND

In a three-dimensional inkjet printing method, a print head is usually used to distribute a model material on a support platform to form a first layer of a to-be-printed target object, and then continue to print multiple layers of the target object, superimpose layer by layer to form the target object, and finally, remove the target object from the support platform. However, due to a strong adhesion of the model material that forms the target object to the support platform, a structure of a bottom surface of the target object is easily damaged during a removing process of the target object. One of the problems to be solved urgently is to enhance a protection of the target object during a printing process.

In some existed three-dimensional inkjet printing methods, a support material layer with a certain thickness is printed before printing the target object, and then, the target object is formed by printing layer by layer on the support material layer.

However, during a process of implementing the prior art, the inventors find that the support material layer is easily cocked or cracked during the printing process of the target object, which results in a problem that the printing of the target object could not be continued. The existed three-dimensional inkjet printing method has a problem of low reliability.

SUMMARY

The present disclosure provides a three-dimensional object inkjet printing method, a printing apparatus and a computer-readable storage medium, which improve the reliability of the three-dimensional inkjet printing method.

According to a first aspect of the present disclosure, a three-dimensional object inkjet printing method is provided, including:

forming an adhesion support portion on a support platform;

forming an elastic support portion on the adhesion support portion, the elastic support portion being embedded with a first elastic portion; and forming a target object by printing layer by layer on the elastic support portion.

Optionally, a material for forming the adhesion support portion is different from a material for forming the elastic support portion.

Optionally, the elastic support portion includes: a support main body and the first elastic portion;

the forming an elastic support portion on the adhesion support portion, including:

printing layer by layer on the adhesion support portion to form the support main body and one or multiple first elastic portions embedded in the support main body, where the first elastic portion extends in a lamination direction of printed layers of the support main body and abuts downward against the adhesion support portion, and the multiple first elastic portions are uniformly distributed in each printed layer of the support main body.

Optionally, the material of the support main body includes a support material; and the material of the first elastic portion includes a model material.

Optionally, voxels occupied by the single first elastic portion in each printed layer of the support main body have a same number. That is, each first elastic portion occupies a same area in each printed layer of the support main body.

Optionally, a material for forming the adhesion support portion is the same as a material for forming the elastic support portion.

Optionally, the first elastic portion is further embedded in the adhesion support portion.

Optionally, the adhesion support portion and the elastic support portion both include: a support main body and the first elastic portion;

the forming an adhesion support portion on a support platform, and forming an elastic support portion on the adhesion support portion, including:

printing layer by layer on the support platform to form the support main body and one or multiple first elastic portions embedded in the support main body, where the first elastic portion extends in a lamination direction of printed layers of the support main body and abuts downward against the support platform, and the multiple first elastic portions are uniformly distributed in each printed layer of the support main body.

Optionally, a material of the support main body includes a support material, or a mixed material of a model material and the support material, and a material of the first elastic portion includes a model material.

Optionally, a single first elastic portion extends in the lamination direction of the printed layers of the support main body, and voxels occupied in at least one of the printed layer and voxels occupied in other printed layers are different in number.

Optionally, voxels occupied by the single first elastic portion in the printed layers in the lamination direction gradually decrease in number.

Optionally, the first elastic portion has a folded or curved shape in at least one plane perpendicular to the support platform.

Optionally, the first elastic portion has a spiral shape.

Optionally, the elastic support portion further includes: a support top layer;

the forming an elastic support portion on the adhesion support portion, further including:

printing layer by layer on the support main body to form the support top layer; and the forming a target object by printing layer by layer on the elastic support portion, including: printing layer by layer on the support top layer to form the target object.

Optionally, the printing layer by layer on the support main body to form the support top layer, including:

spraying a support material on the support main body, and printing layer by layer to form the support top layer, where the support top layer covers at least a projection region of the target object on the support main body.

Optionally, a coverage region of the support top layer on the support main body is the projection region of the target object on the support main body.

Optionally, the forming an adhesion support portion on a support platform including: spraying a model material, or a mixed material of a support material and the model material, on the support platform, and printing layer by layer to form the adhesion support portion.

Optionally, the forming an adhesion support portion on a support platform, including:

forming an adhesion support portion having a light-absorbing color surface on the support platform.

Optionally, the forming a target object by printing layer by layer on the elastic support portion, including:

spraying a model material on the elastic support portion, and printing layer by layer to form the target object; and printing layer by layer on the elastic support portion to form a protection layer that at least partially wraps the target object.

Optionally, the forming a target object by printing layer by layer on the elastic support portion, including:

spraying a model material on the elastic support portion, and printing layer by layer to form the target object; and printing layer by layer on the elastic support portion and the support platform to form a protection layer that at least partially wraps the target object.

Optionally, the protection layer includes a support layer that embeds an elastic extending portion; a material of the support layer includes a support material, a material of the elastic extending portion includes a model material, and the elastic extending portion is an extending part of the first elastic portion.

Optionally, the protection layer includes a support layer that embeds an elastic extending portion and a second elastic portion, a material of the support layer includes a support material, a material of the elastic extending portion and the second elastic portion includes a model material, and the elastic extending portion is an extending part of the first elastic portion, and the second elastic portion abuts downward against the support platform.

Optionally, a projection formed by the adhesion support portion on the support platform overlaps with a projection formed by the elastic support portion on the support platform; a projection formed by the target object on the support platform is within the projection formed by the adhesion support portion or the projection formed by the elastic support portion on the support platform, and shapes of the projections of the adhesion support portion, the elastic support portion and the target object are the same.

Optionally, in a direction perpendicular to the support platform, a height of the adhesion support portion is smaller than a height of the elastic support portion.

According to a second aspect of the present disclosure, a printing apparatus is provided, including: a print head, a support platform and a controller;

the controller is configured to control the print head to implement the three-dimensional object inkjet printing method according to the first aspect and any possible implementations of the first aspect of the present disclosure.

Optionally, further including a leveling component;

the controller is further configured to control the leveling component to perform leveling processing to each printed layer of the target object.

Optionally, further including a curing component;

the controller is further configured to control the curing component to perform curing processing to a material sprayed by the print head.

According to a third aspect of the present disclosure, a printing apparatus is provided, including: a memory, a processor and a computer program, the computer program is stored in the memory, and the processor runs the computer program to execute the three-dimensional object inkjet printing method of the first aspect and various possible designs of the first aspect of the present disclosure.

According to a fourth aspect of the present disclosure, a computer-readable storage medium is provided, the computer-readable storage medium stores a computer program, and the computer program is configured to, when executed by a processor, implement the three-dimensional object inkjet printing method of the first aspect and various possible designs of the first aspect of the present disclosure.

Embodiments of the present disclosure provide a three-dimensional object inkjet printing method, a printing apparatus and a computer-readable storage medium, by firstly forming an adhesion support portion on a support platform, the adhesion support portion and a structure thereon can be tightly bonded to the support platform; and then, an elastic support portion is formed on the adhesion support portion, the elastic support portion is embedded with a first elastic portion, and thus when subjected to an impact force from, for example, a leveling component, the impact force can be buffered by the elastic support portion; and finally, the target object is formed by printing layer by layer on the elastic support portion, so as to reduce a possibility of affecting a printing precision due to a separation of a material layer and the support platform, a possibility of cracking in a bottom of the support when subjected to an impact force during an inkjet printing process is reduced at the same time, and a printing reliability is improved.

DESCRIPTION OF EMBODIMENTS

Figure 1:
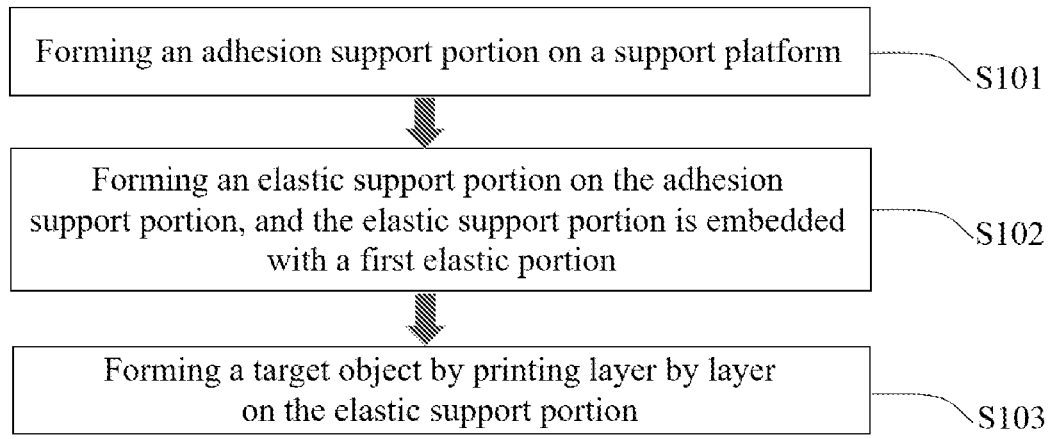
FIG. 1 is a schematic diagram of a three-dimensional object inkjet printing method provided by an embodiment of the present disclosure.

In order to make the purposes, technical solutions and advantages of embodiments of the present disclosure more clear, technical solutions in embodiments of the present disclosure will be described clearly and completely below in combination with the accompanying drawings of the embodiments of the present disclosure. Obviously, the described embodiments are merely a part, but not all, of the embodiments of the present disclosure. Based on embodiments of the present disclosure, all the other embodiments acquired by those skilled in the art without paying any creative work shall belong to the protection scope of the present disclosure.

It should be understood that, in various embodiments of the present disclosure, serial number of each process does not imply an execution order, and that the execution order of each process shall be determined by function and intrinsic logic thereof, and shall not constitute any limitations to the implementation process of the embodiments of the present disclosure.

It should be understood that, in the present disclosure, the wording "include" and "have", and any variation thereof, are intended to cover non-exclusive inclusion, e.g., a process, a method, a system, a product or an apparatus which includes a series of steps or units is not necessarily limited to steps or units that are clearly listed, but may include other steps or units that are not clearly listed or inherent to those processes, methods, products, or apparatus.

It should be understood that, in the present disclosure, "multiple" means two or more. "and/or" is simply a description of an associated relationship of associated objects, and indicates that there may exist three relationships. For example, A and/or B, may represent three cases: A exists alone, both A and B exists at the same time, and B exists alone. The character "I" generally indicates an "or" relationship between the associated objects before and after. "Including A, B and C", "including A, B, C" refer to include all of A, B and C, and "including A, B or C" refers to include one of A, B and C, and "including A, B and/or C" refers to include any one or any two or three of A, B and C.

It should be understood that, in the present disclosure, "B corresponding to A", "B which corresponds to A", "A corresponds to B", or "B corresponds to A", indicates that B is associated with A, and that B can be determined according to A. Determining B based on A does not mean that B is determined merely based on A, but means that B can be determined based on A and/or other information. Matching between A and B is that a similarity between A and B is greater than or equal to a predetermined threshold.

Depending on the context, for example, "if", which is used herein, can be interpreted as "at . . . ", or "when . . . ", or "in response to determination", or "in response to detection".

Depending on the context, "if" as used herein can be interpreted as "in" or "when" or "in response to determination" or "in response to detection".

The technical solutions of the present disclosure are described below in detail by specific embodiments. The specific embodiments below may be combined with each other, and the same or similar concepts or processes may not be repeated in some embodiments.

Printing in the present application all refers to printing layer by layer, for example, it can be understood that a printing material is firstly sprayed to form a first layer of a to-be-printed object, and then the printing material is continuously sprayed on the first layer to form a second layer of a target object, and so on to form multiple layers, and the to-be-printed object is formed by superimposing layer by layer.

A support material in the present application refers to a material used to form a support frame for the to-be-printed target object, which can usually be peeled off or dissolved by post-processing after the printing is finished, so as to be separated from the target object constituted by a model material.

The model material in the present application refers to a material used to form the target object by printing.

Figure 2:
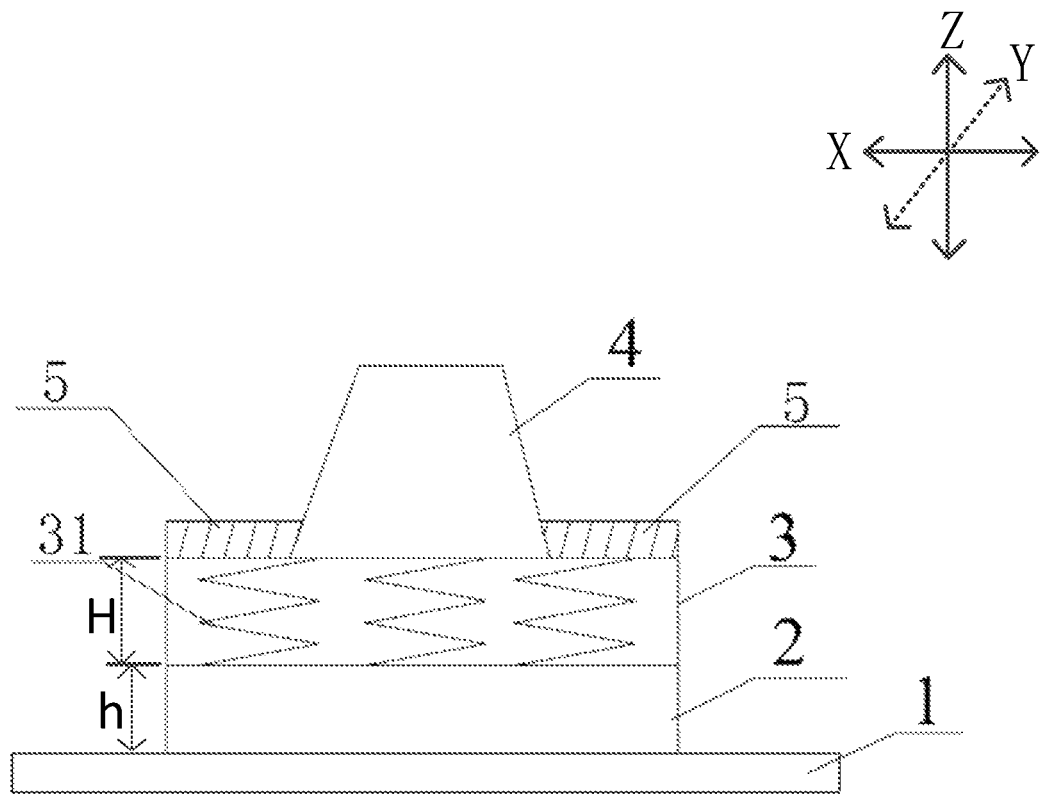
FIG. 2 is an optional structural schematic diagram formed by a three-dimensional object inkjet printing method provided by an embodiment of the present disclosure.

Refer to FIG. 1, which is a schematic diagram of a three-dimensional object inkjet printing method provided by an embodiment of the present disclosure, and refer to FIG. 2, which is an optional structural schematic diagram formed by a three-dimensional object inkjet printing method provided by an embodiment of the present disclosure. The execution body of the method shown in FIG. 1 may be a printing apparatus, and the printing apparatus implements the following various embodiments by controlling to spray a model material and a support material, and finally prints the target object shown in FIG. 2. The three-dimensional object inkjet printing method shown in FIG. 1 includes steps S101 to S103, which are specifically as follows:

S101, forming an adhesion support portion on a support platform.

Refer to the adhesion support portion 2 in FIG. 2, it can be construed as a structure with a strong adhesion capability and a strong mechanical strength, which is used to adhere to the support platform 1 and provide support for a printing structure thereon. There may be many ways to form the adhesion support portion 2, and two alternative ways are exemplified below.

In an implementation of forming the adhesion support portion 2, the model material may be sprayed on the support platform 1 and the adhesion support portion 2 may be formed by printing layer by layer. While providing support, the adhesion support portion 2 formed by the model material can have a strong adhesion performance and mechanical strength to reduce a possibility of a separation of the adhesion support portion 2 from the support platform 1 during a printing process and provide support for the printing structure thereon without breaking or cracking at the same time.

In another implementation of forming the adhesion support portion 2, a mixed material of the support material and the model material may be sprayed on the support platform 1. The support material generally has a weaker mechanical strength than that of the model material, and the model material has a higher mechanical strength and stronger adhesion performance. Mixing the model material with the support material can overcome a defect that cocking and cracking easily occur due to using the support material only.

In an implementation, the mixed material can be construed as a material being formed by uniformly mixing the support material and the model material. By controlling a uniform distribution of the material in the adhesion support portion 2, the mechanical strength of the material of the adhesion support portion 2 is uniformly distributed, as so an adhesion of each part of the adhesion support portion 2 to the support platform 1 is basically the same. For example, the adhesion support portion 2 is formed by spraying the model material and the support material to form a mixed layer of the model material and the support material, and by superimposing layer by layer, where the support material and the model material in each layer of the adhesion support portion 2 are uniformly distributed. The mixing way between the support material and the model material in the embodiment may be pre-mixing before the support material and the model material entering the print head, or controlling, by virtue of bitmap data, an ink dropping point of the support material and an ink dropping point of the model material to be evenly distributed relative to each other on the printed layer, so that the support material and the model material are mixed on the printed layer.

In the embodiment, by printing the adhesion support portion 2, the adhesion support portion 2 and a structure thereon can be tightly bonded to the support platform 1, and a possibility of the cracking of the adhesion support portion 2 is relatively low during an inkjet printing process, so as to reduce a possibility of affecting a printing precision due to the separation of the material layer and the support platform 1. At the same time, the adhesion support portion 2 has sufficient mechanical strength to withstand a gravity of its own and a gravity of other structures thereon, thus reducing a possibility of cracking at a bottom of the support during the inkjet printing process and improving a printing reliability.

In the embodiment, the model material refers to a material that forms a physical structure of the target object 4. The model material used to form the adhesion support portion 2 may include one or more model materials, for example, a mixture of one or more of model materials of different colors and model materials of different mechanical strengths. The model material used to form the physical structure of the target object 4 may be defined as a first model material, and the model material used to form the adhesion support portion, or included in the elastic support portion and the protection layer may be defined as a second model material. The first model material may be the same as the second model material, or the first model material may be different from the second model material.

In the embodiment, the support material refers to a material with a support function during the process of forming a physical structure of the target object 4, which can be separated from the physical structure of the target object 4 by a post-processing step after the printing of the physical structure of the target object 4 is finished.

Optionally, in an implementation, an adhesion support portion 2 having a light-absorbing color surface may be formed on the support platform 1. For example, materials of light-absorbing colors, such as black or gray, may be selected for printing by the adhesion support portion 2. During the inkjet printing process, the surface of the adhesion support portion 2 with high absorbance can increase absorbance of the UV light irradiated on the surface of the adhesion support portion 2, which reduce a possibility that the UV light irradiated on the surface of the adhesion support portion 2 is reflected to a surface of the print head, and the model material droplet on the surface of the print head is cured by the reflected light and thus blocks a nozzle of the print head.

S102, forming an elastic support portion on the adhesion support portion, and the elastic support portion is embedded with a first elastic portion.

In the inkjet printing process, the material layer needs to be leveled with a leveling component, for example, an excess material on a surface of the material layer is taken away by a rotation of a leveling roller to improve a surface accuracy of the material layer. The elastic support portion 3 can be construed as a support structure with elastic characteristics. During a leveling process, when the leveling component suddenly hits a target object 4 that is being printed or has been printed, the leveling component is not easily damaged due to a buffering effect of the first elastic portion 31 embedded in the elastic support portion 3, and a material layer of the target object 4 is not easily damaged, which further improves a printing success rate of the target object 4.

Figure 3:
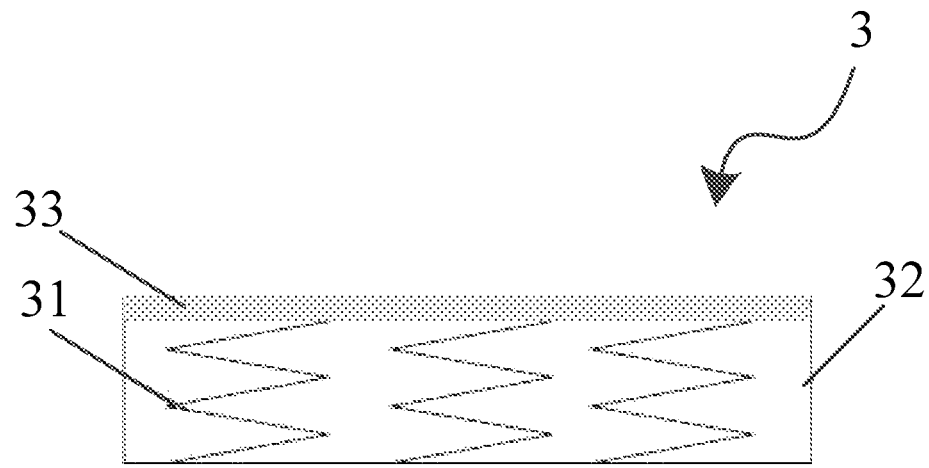
FIG. 3 is a structural schematic diagram of an elastic support portion with a support top layer provided by an embodiment of the present disclosure.

Refer to FIG. 3, which is a schematic structural diagram of an elastic support portion with a support top layer provided by an embodiment of the present disclosure. In an optional implementation manner, the elastic support portion 3 may include an elastic support main body 32 and the first elastic portion 31. An implementation manner of forming the elastic support portion 3 on the adhesion support portion 2 shown in FIG. 2 may be: printing layer by layer on the adhesion support portion 2 to form the support main body 32 and one or multiple first elastic portions 31 embedded in the support main body 32 shown in FIG. 3, where the first elastic portion 31 extends in a lamination direction of the printed layers of the support main body 32 and abuts downward against the adhesion support portion, the multiple first elastic portions 31 are uniformly distributed in each printed layer of the support main body 32.

On the basis of the foregoing embodiments, continue to refer to FIG. 3, the elastic support portion 3 further includes: a support top layer 33. Then, in a process of forming the elastic support portion 3 by printing layer by layer on the adhesion support portion, the support top layer 33 may also be formed by printing layer by layer on the support main body 32. Accordingly, a process of forming a target object by printing layer by layer on the elastic support portion 3 includes: printing layer by layer on the support top layer 33 to form the target object. Where, the support top layer 33 may be formed by spraying a support material on the support main body 32 and printing layer by layer to form the support top layer 33, where the support top layer 33 at least covers a projection region of the target object on the support main body 32. The support top layer 33 is formed by the support material, thus facilitating a removal of the target object from the support platform. The elastic support portion 3 can be construed as a part containing an elastic structure (the first elastic portion 31), which provides support and buffering for the target object supported by the support top layer 33.

Figure 4:
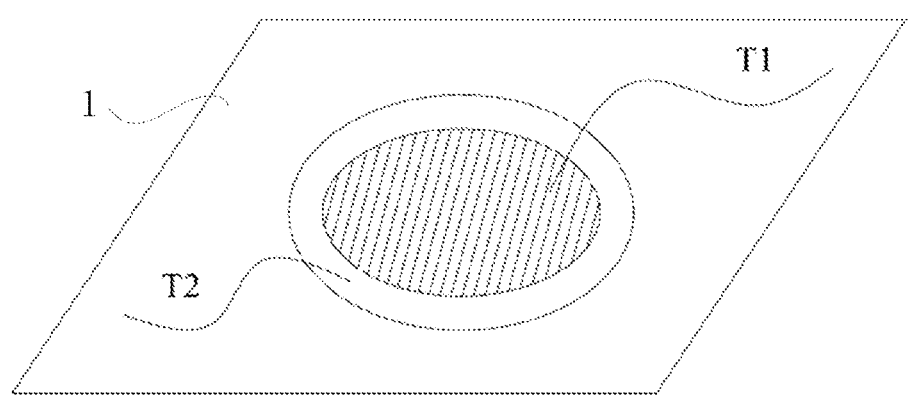
FIG. 4 is a schematic diagram of projections of an adhesion support portion, an elastic support portion and a target object on a support platform provided by an embodiment of the present disclosure.

In the above-mentioned embodiments, shapes and heights of the adhesion support portion 2 and the elastic support portion 3 can be selected in various ways. Optionally, a projection of the adhesion support portion 2 on the support platform 1 overlaps with a projection of the elastic support portion 3 on the support platform 1; a projection formed by the target object 4 on the support platform 1 is within the projection formed by the adhesion support portion 2 or the projection formed by the elastic support portion 3 on the support platform 1, and shapes of the projections of the adhesion support portion 2, the elastic support portion 3 and the target object 4 are the same. Specifically, in the embodiment, it can be understood that the shape of the projection of the elastic support portion 3 on the support platform 1 is the same as the shape of the projection of the to-be-printed target object 4 on the support platform 1. An area and a shape of the projection of the adhesion support portion 2 on the support platform 1 are the same with an area and a shape of the projection of the elastic support portion 3 on the support platform 1. Refer to FIG. 4, which is a schematic diagram of projections of an adhesion support portion, an elastic support portion and a target object on a support platform provided by an embodiment of the present disclosure. As shown in FIG. 4, T1 is the projection of the target object 4 on the support platform 1, and T2 is the projection of the adhesion support portion 2 and the elastic support portion 3 on the support platform 1, where the shape of T1 is the same as that of T2, and the area of T1 is smaller than the area of T2. In the embodiment, by controlling the shapes of the projection of the adhesion support portion 2 and the elastic support portion 3 on the support platform 1 to be the same as the shape of the projection of the to-be-printed target object 4 on the support platform 1, a material usage of the adhesion support portion 2 and the elastic support portion 3 can be reduced, a printing cost of the to-be-printed target object 4 can be also reduced, and a printing efficiency is improved. In the embodiment, by controlling the area of the projection of the adhesion support portion 2 and the elastic support portion 3 on the support platform 1 to be larger than the area of the projection of the target object 4 on the support platform 1, the support effect can be improved and a risk of cracking of the material layer during the printing process can be further reduced.

In a direction perpendicular to the support platform 1, a height of the adhesion support portion 2 is smaller than a height of the elastic support portion 3. In the embodiment, the height of the adhesion support portion 2 is a first height value h, the height of the elastic support portion 3 is a second height value H, and the first height value h is smaller than the second height value H. Specifically, a size of the first height value h in the embodiment needs to be determined according to the mechanical strength of the model material, or the mechanical strength of the mixed material of the model material and the support material, generally, the first height value h can be selected as 0.1-1 mm, preferably 0.1-0.5 mm. The size of the second height value H in the embodiment can be determined according to a structure of a leveling component used, for example, a distance between a lower surface of the leveling component and an upper surface of the support platform 1 minus the first height value h is determined as the second height value H. For example, the second height value H may be 0.6-10 mm, preferably 0.6-3 mm. In the embodiment, in order to ensure the buffering performance of the elastic support portion 3, preferably, the first height value h is smaller than the second height value H, the adhesion support portion 2 with a smaller height can provide more stable support, while the elastic support portion 3 with a higher height can provide a sufficient deformation stroke during the buffering process.

In the embodiment, before printing the target object 4, the adhesion support portion 2 with the first height value h and the elastic support portion 3 with the second height value H are formed firstly, so that the leveling component can perform the leveling on each layer of the target object 4, thereby improving an accuracy of the printed target object 4.

S103, forming a target object by printing layer by layer on the elastic support portion.

According to the printing data of the target object 4, the model material is sprayed layer by layer on the elastic support 3 to print layers of the target object 4 which are then superimposed to form the to-be-printed target object 4. During the printing process of the target object 4, due to the presence of the adhesion support portion 2 and the elastic support portion 3, there is a certain height difference between the target object 4 raised and the support platform 1, so that the leveling component can be used to level each printed layer of the target object 4, which improves the flexibility and accuracy of leveling. After the printing of the target object 4 is finished, the target object 4 is peeled off from the elastic support 3 to obtain a final target object 4.

Where in the embodiment in which the elastic support portion 3 has a support top layer, the process of printing layer by layer to form the target object 4 can be construed as: printing layer by layer on the support top layer to form the target object 4. The support top layer is usually made of a support material. Thus, after the printing of the target object 4 is finished, the material of the support top layer can be separated from the target object 4 through a post-processing method such as peeling or dissolving.

In an optional implementation manner, step S103 (forming a target object by printing layer by layer on the elastic support portion) may be, for example, spraying a model material on the elastic support portion, and printing layer by layer to form the target object; and printing layer by layer on the elastic support portion to form a protection layer that at least partially wraps the target object. One structure of the protection layer can be seen in FIG. 2, the protection layer 5 can be printed while printing the target object 4, or the protection layer 5 is printed first and then the protection layer 5 is formed by spraying a support material layer by layer around the to-be-printed target object 4. Continue to refer to FIG. 2, the protection layer 5 can wrap a lower part of the target object 4 and can also wrap an upper surface of the elastic support portion 3 at the same time.

Figure 5:
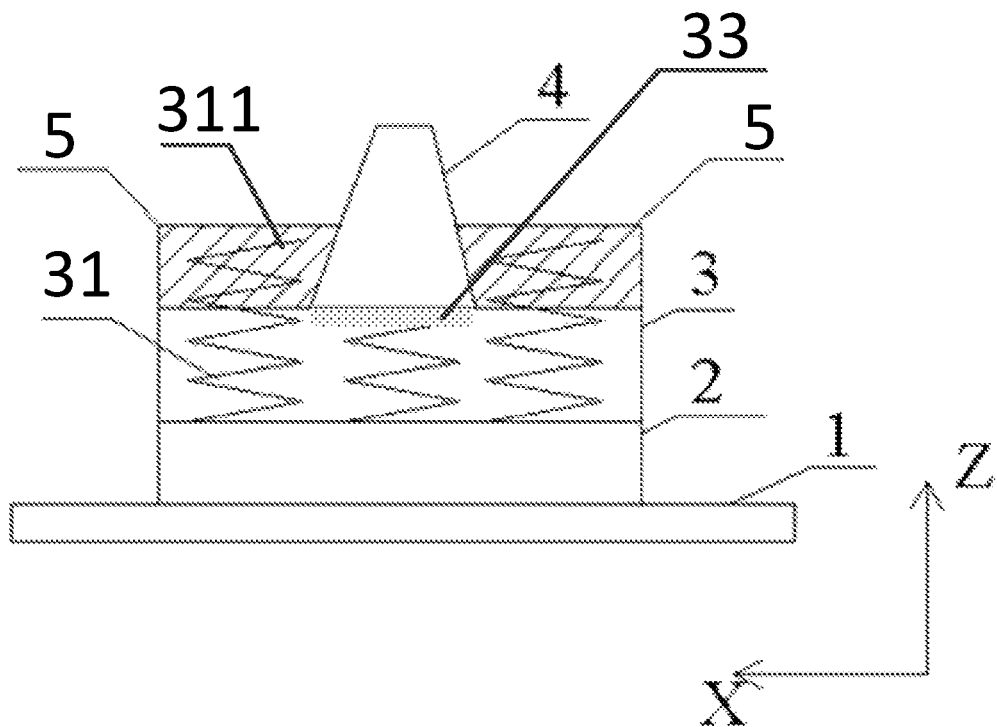
FIG. 5 is a structural schematic diagram of a protection layer with an elastic extending portion provided by an embodiment of the present disclosure.

In an optional implementation manner, in an implementation manner in which the elastic support portion 3 has a support top layer, a coverage region of the support top layer on the support main body is a projection region of the target object on the support main body. Refer to FIG. 5, it is a structural schematic diagram of the protection layer with an elastic extending portion provided by an embodiment of the present disclosure. Refer to FIG. 5, the target object 4 is on the support top layer 33 and a coverage region of the support top layer 33 on the support main body 32 is a projection region of the target object 4 on the support top layer 33. In the present disclosure, the printing of the support top layer is not limited to be after that the printing of the support main body is finished, the support top layer can also be printed during the process of printing the support main body. The protection layer 5 includes a support layer embedded with an elastic extending portion 311; and a material of the support layer includes a support material, a material of the elastic extending portion 311 includes a model material, and the elastic extending portion 311 is an extending part of the first elastic portion 31. The shape of the elastic extending portion 311 is also the same as the shape of the first elastic portion 31. In the embodiment, by providing the elastic extending portion 311, the adhesion between the protection layer and the elastic support portion is strengthened, and the possibility of cocking of the protection layer or the elastic support portion is reduced, and/or a phenomenon of cracking which happens between the protection layer and the elastic support portion is reduced. In an implementation manner, during the printing process of the physical structure of the target object 4, a support frame needs to be printed by the support material first, and the target object 4 wrapped by the protection layer 5 may include the physical structure of the to-be-printed target object and the support frame of the target object. For example, in a structure shown in FIG. 2, the lower part of the target object 4 can be shielded and protected by the protection layer 5 formed by the support material to reduce the possibility of the lower part of the printed target object 4 being overly cured. In the embodiment in which the protection layer 5 covers an upper surface of the support main body, the protection layer 5 can also protect an upper surface of the support main body, thus reducing the possibility of cocking of the material layer caused by the over-curing of the upper surface of the support main body.

Figure 6:
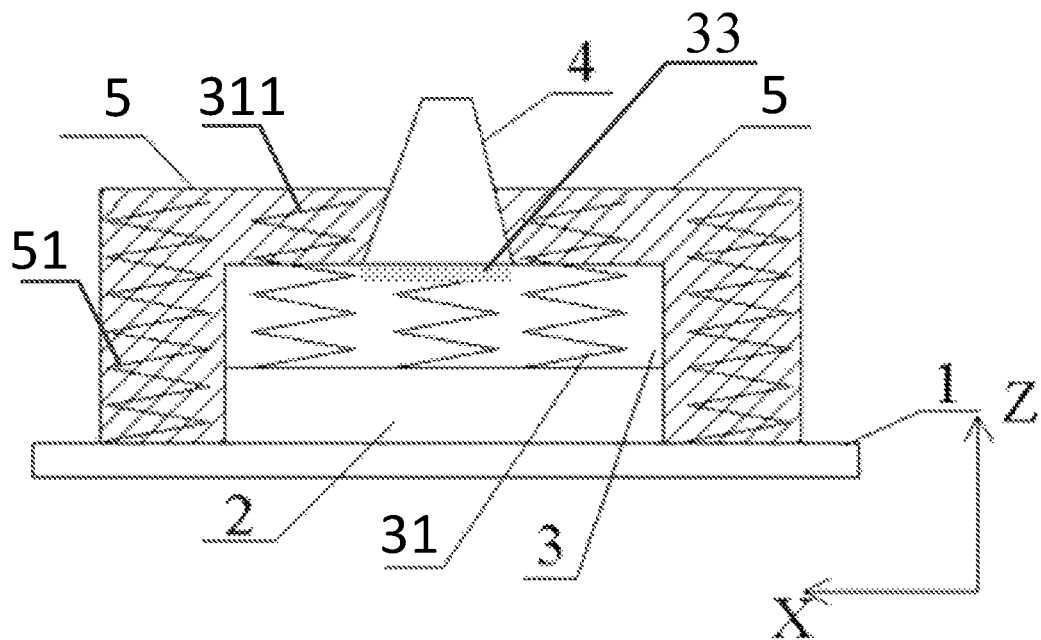
FIG. 6 is a structural schematic diagram of a protection layer with an elastic extending portion and a second elastic portion provided by an embodiment of the present disclosure.

In another optional implementation manner, refer to FIG. 6, which is a structural schematic diagram of a protection layer with an elastic extending portion and a second elastic portion provided by an embodiment of the present disclosure. Step S103 (forming a target object by printing layer by layer on the elastic support portion) may be, for example, spraying a model material on the elastic support portion and forming the target object by printing layer by layer; and printing layer by layer on the elastic support portion and the support platform to form a protection layer that at least partially wraps the target object. The printing of the protection layer in the embodiment is not limited to be after that the forming of the elastic support portion is finished, and the protection layer can also be printed layer by layer at the same time during the process of printing the adhesion support portion, the elastic support portion and the target object. Refer to FIG. 6, the protection layer 5 in the embodiment covers on the elastic support portion and the support platform, and plays a role of protection of a top surface and a side surface of the elastic support portion, a side surface of the adhesion support portion, and a side surface of the object, and avoids cocking caused by over-curing, and at the same time, it also has an effect of buckling the adhesion support portion, the elastic support portion and the target object on the support platform, the effect of preventing the elastic support portion from being cocking can be improved by increasing a protection area. Continue to refer to FIG. 6, the protection layer in the embodiment may include a support layer that embeds the elastic extending portion 311 and the second elastic portion 51. A material of the support layer may include a support material, the material of the elastic extending portion 311 and the second elastic portion 51 may include a model material, and the elastic extending portion 311 is an extending part of the first elastic portion 31, and the second elastic portion 51 abuts downward against the support platform. The second elastic portion 51 may be a first elastic portion 31 having the same structure as the first elastic portion 31. In the embodiment, an adhesion between the protection layer and the support platform can be improved by providing the second elastic portion 51, thereby improving the protective effect of the protection layer.

The embodiment of the present disclosure provides a three-dimensional object inkjet printing method, by forming the adhesion support portion 2 on the support platform 1 first, so that the adhesion support portion 2 and the structure thereon can be closely bound to the support platform 1, and the elastic support portion 3 is then formed on the adhesion support portion 2, and the elastic support portion is embedded with a first elastic portion, which can be buffered by the elastic support portion 3 when it is subjected to an impact force of, for example, a leveling component; the target object 4 is finally formed by printing layer by layer on the elastic support portion 3, thereby reducing the possibility of affecting the printing precision due to the separation of the material layer and the support platform 1, as well as reducing the possibility of cracking which happens in the bottom of the support when subjected to an impact force during the inkjet printing process at the same time, and improving a printing reliability.

On the basis of the above-mentioned embodiments, in order to describe the structure of the elastic support portion 3 more clearly, in the embodiment in which the elastic support portion 3 has a support main body and a support top layer, various possible implementations of the elastic support portion are illustrated below.

Specifically, continue to refer to FIG. 3, the elastic support portion 3 may include: a support main body 32 and a first elastic portion 31. In the above embodiments, the support main body 32 and one or multiple first elastic portions 31 embedded in the support main body 32 are formed by printing layer by layer on the adhesion support portion 2, where the first elastic portion 31 extends in a lamination direction of printed layers of the support main body 32 and abuts downward against the adhesion support portion 2, and the multiple first elastic portions 31 are uniformly distributed in each printed layer of the support main body 32. The support top layer 33 in FIG. 3 may be present or may be absent, and a coverage range of the support top layer 33 may be a top surface of the entire support main body 32, or may be limited to the projection region of the target object. The material of the support main body 32 includes a support material; the material of the first elastic portion 31 includes a model material.

It can be understood that the support main body 32 is a part arranged around the first elastic portion 31 to fill a gap of the first elastic portion 31, and the support main body 32 and the first elastic portion 31 form a solid elastic support portion 3. The first elastic portion 31 abuts downward against the adhesion support portion 2, which can be construed as: one end of the first elastic portion 31 contacts with the adhesion support portion 2 that is under the support main body 32, the other end of the first elastic portion 31 that exposes outside of the support main body 32 contacts with the target object above the support main body, or, the other end of the first elastic portion that exposes outside of the support main body 32 contacts with the support top layer 33 above the support main body, and/or the other end that exposes outside of the support main body 32 contacts with the elastic extending portion 311 above the support main body.

Figure 7A:
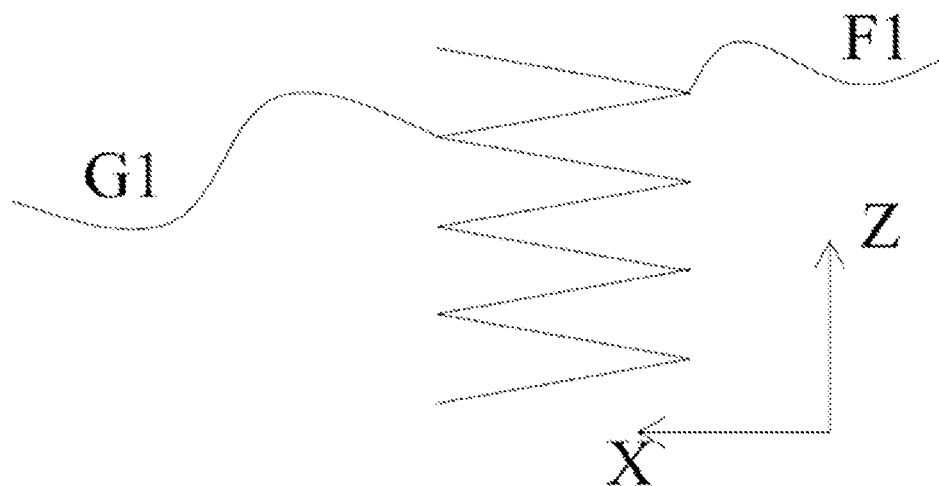
FIGS. 7a-7d are sectional schematic diagrams of a first elastic portion in a plane perpendicular to a support platform provided by an embodiment of the present disclosure.
Figure 7B:
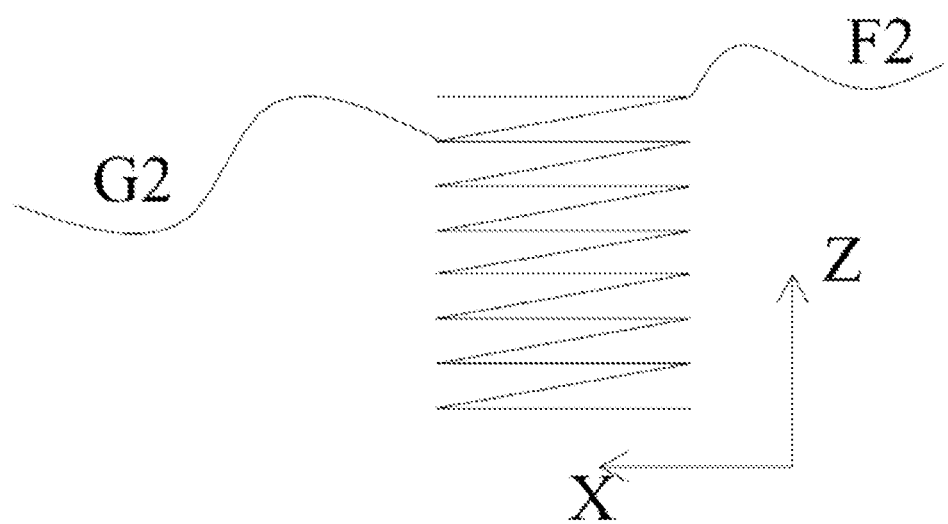
Figure 7C:
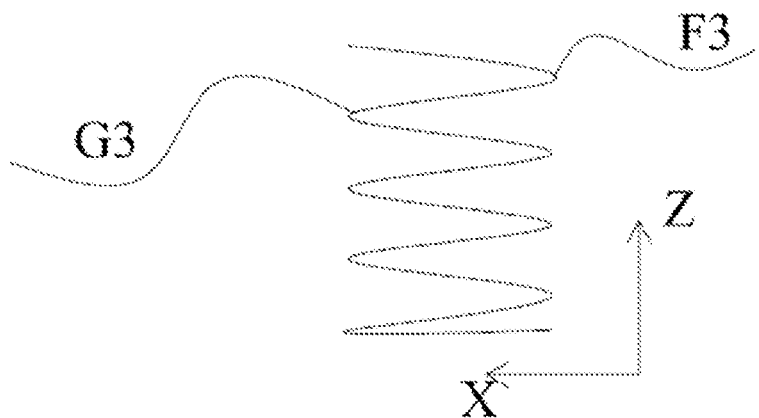

Refer to FIGS. 7a to 7c, which are sectional schematic diagrams of the first elastic portion in a plane perpendicular to the support platform provided by an embodiment of the present disclosure. In FIGS. 7a-7c, the Z direction represents a lamination direction, the X direction represents a scanning direction of the print head, the Y direction represents a stepping direction of the print head, the XY plane represents a printing plane (which can be construed as the plane where the support platform 1 is located), and the XZ plane represents a lamination plane perpendicular to the printing plane.

In an implementation manner, refer to FIGS. 7a to 7c, the first elastic portion 31 has a folded or curved shape in at least one plane perpendicular to the support platform 1. It can be understood that the sectional structure of the first elastic portion 31 obtained in at least one plane perpendicular to the support platform 1 is of a folded shape or a curved shape. In an implementation manner in which the sectional structure is of a folded shape, such as the example of FIG. 7a, the first elastic portion 31 extends in the Z direction and has peaks F1 and valleys G1 at intervals on the XZ plane, and the structure constituting the peaks and valleys is of a diagonal line structure. As another example, in the example of FIG. 7b, the first elastic portion 31 extends in the Z direction and includes peaks F2 and valleys G2 at intervals on the XZ plane, and the structures constituting the peaks and valleys are of a diagonal structure and a linear structure that is parallel to the XY plane. In an implementation in which the sectional structure is of a curved structure, for example, in the example of FIG. 7c, the first elastic portion 31 extends in the Z direction and includes peaks F3 and valleys G3 at interval on the XZ plane, and the structure constituting the peaks and valleys is of a curved structure. The shapes of the peaks and valleys in the above three examples can be the same or different, and FIGS. 7a to 7c are simply optional examples. In the above examples, the first elastic portion 31 may be of a strip-shaped structure with a certain width, which is of a folded or a curved shape in multiple planes perpendicular to the support platform 1.

Figure 7D:
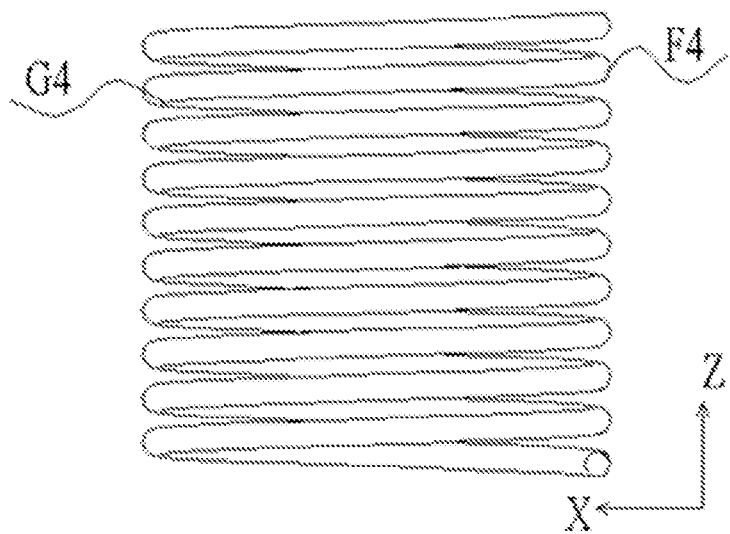

In another implementation manner, refer to FIG. 7d, which is a schematic structural diagram of an optional spiral-shaped first elastic portion 31 provided by an embodiment of the present disclosure. The first elastic portion 31 is of a spiral shape and has a spring-like structure.

In an implementation manner, the material of the support main body includes a support material; the material of the first elastic portion 31 includes a model material. The first elastic portion 31 obtained by printing the model material improves the elastic effect of the elastic support portion. In the embodiment, the first elastic portion 31 is formed by spraying the model material, and the adhesion support portion 2 is formed by spraying the model material or a mixed material of the model material and the support material. The performance of the material of the first elastic portion 31 is the same as or similar to that of the adhesion support portion 2. Thus, the first elastic portion 31 penetrates the support main body and contacts with a top layer of the adhesion support portion 2, which can improve the adhesion between the adhesion support portion 2 and the elastic support portion 3, thereby further reducing the possibility of cocking of the material layer.

The shapes of the elastic structures in the above various embodiments are similar to that of a spring. An elastic effect of the first elastic portion 31 can be improved through the structures shown in FIG. 7a-7d, or the elastic effect can be improved by materials alone, or the elastic effect can be improved by combining materials on the basis of the structures shown in FIGS. 7a-7d.

Figure 8:
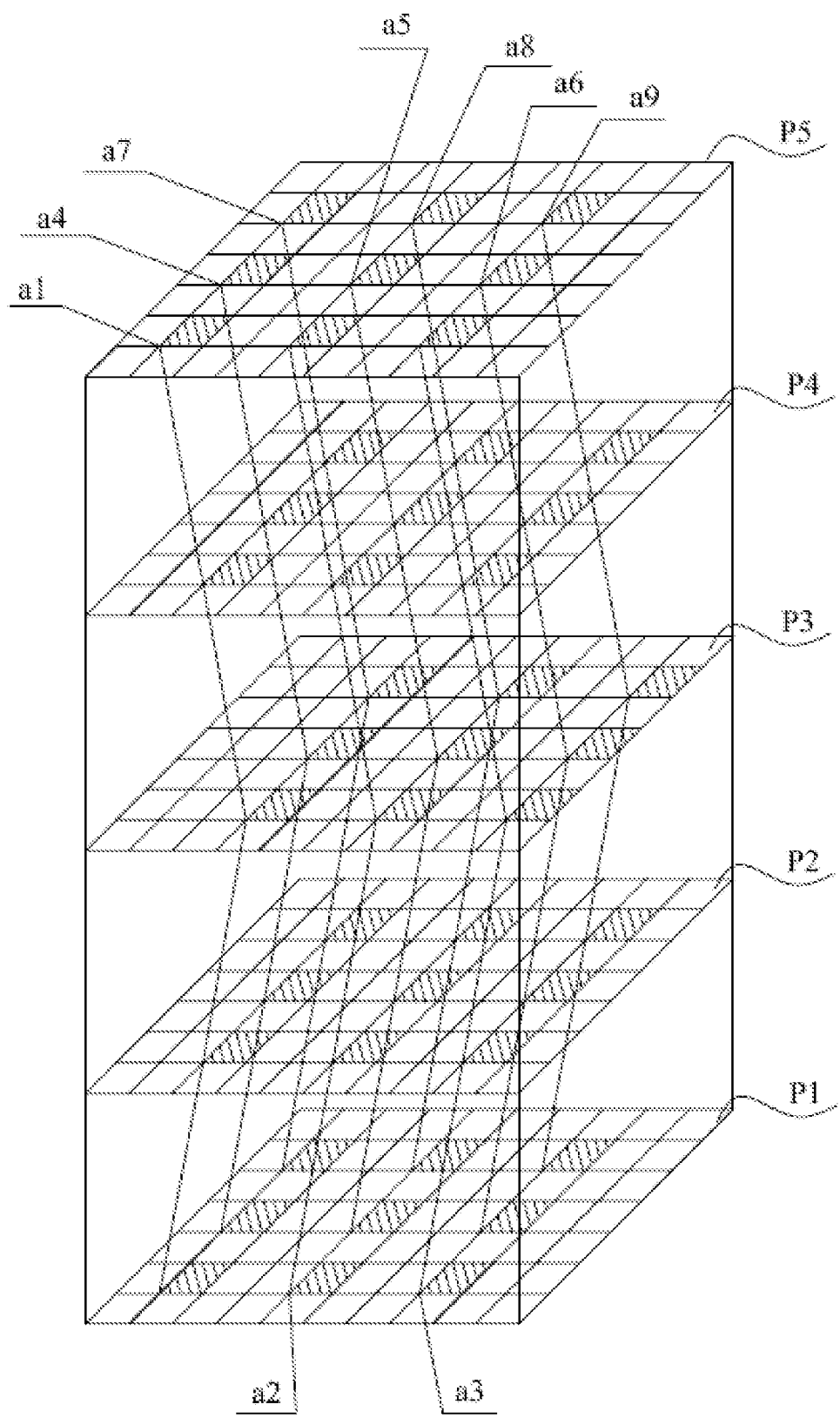
FIG. 8 is a structural schematic diagram of an elastic support portion provided by an embodiment of the present disclosure.

Optionally, the first elastic portions 31 are uniformly distributed in the support main body in the plane direction of the printed layer. Refer to FIG. 8, which is a structural schematic diagram of the elastic support portion provided by an embodiment of the present disclosure. FIG. 8 shows a first elastic portion 31 whose section is of a folded shape. In the figure, P1-P5 respectively represent bitmap images of five transverse slicing layers in the elastic support portion. Among them, in each transverse slicing layer, the oblique squares represent positions of voxels printed by the model material, the blank squares represent positions of voxels printed by the support material, and a1-a9 respectively represent nine first elastic portions 31 formed by spraying the model material. The nine first elastic portions 31 are uniformly distributed in the elastic support portion, and the model material on the plane of each transverse slicing layer is also uniformly distributed.

In an implementation shown in FIG. 8, a width of a respective first elastic portion 31 can be determined by setting the number of voxels occupied by the model material on the bitmap image of each transverse slicing layer. In the bitmap image of a single transverse slicing layer shown in FIG. 8, a single first elastic portion 31 occupies a position of one voxel. It can be seen that the width of the single first elastic portion 31 shown in FIG. 8 is the size of one voxel.

Figure 9A:
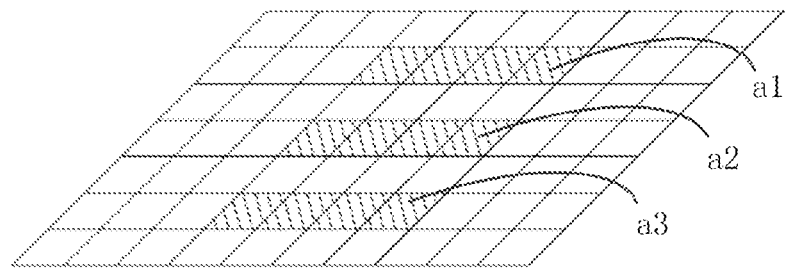
FIGS. 9a-9b are exemplary bitmap images of a transverse slicing layer provided by an embodiment of the present disclosure.
Figure 9B:
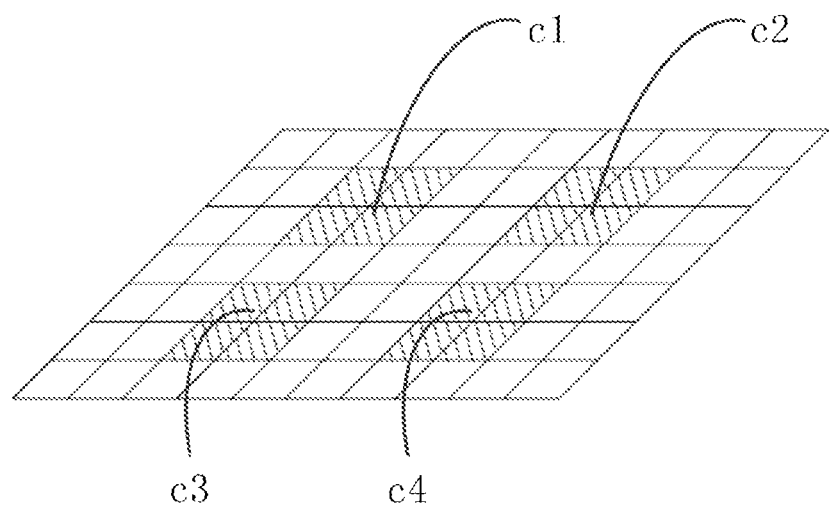

In another implementation manner, refer to FIGS. 9a to 9b, which are exemplary bitmap images of a transverse slicing layer provided by an embodiment of the present disclosure. The width of a single first elastic portion 31 may also be a sum of the sizes of multiple adjacent voxels. The sum of the sizes of four consecutively arranged voxels in FIG. 9a represents the width of a single first elastic portion 31 (a1 or a2 or a3), and the sum of the sizes of the four voxels in FIG. 9b that share a same vertex represents the width of a single first elastic portion 31 (c1 or c2 or c3 or c4). In the embodiment, the width of the first elastic portion 31 may also be in other forms, which will not be listed here.

Optionally, voxels occupied by the single first elastic portion 31 in each printed layer of the support main body have the same number, which improves the uniformity of elastic performance. It can also be understood that, in FIGS. 8 and 9a to 9b, the numbers of voxels occupied by the single first elastic portion 31 on different transverse slicing layers of the support main body are the same. In the embodiment, the multiple first elastic portions 31 included in the support main body have the same shape and size, and are uniformly distributed in the elastic support portion on the plane of each printed layer, so that the mechanical strength and the buffering performance of the material in each place of the elastic support portion are basically the same.

Figure 10A:
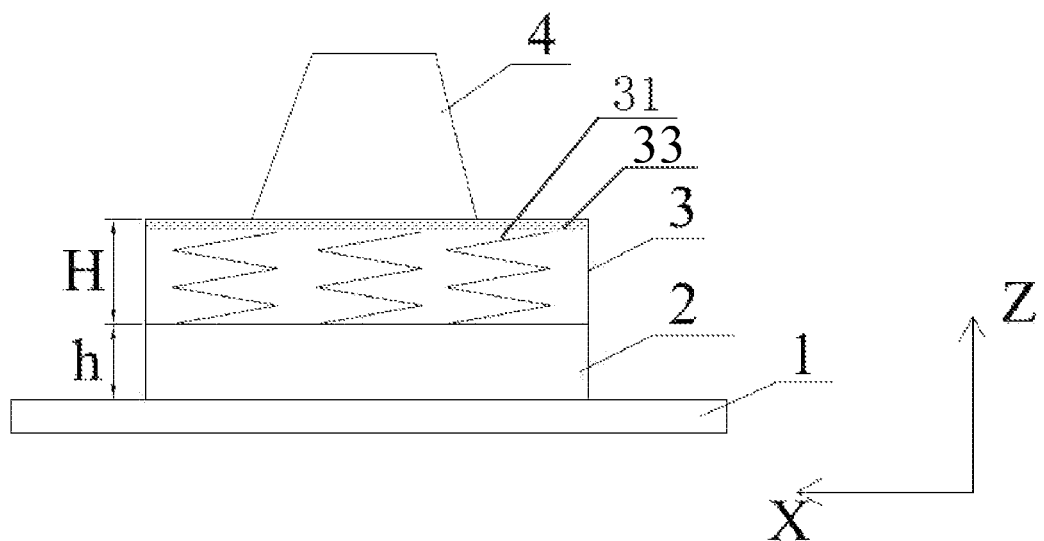
FIGS. 10a-10b are schematic diagrams of a target object provided by an embodiment of the present disclosure.
Figure 10B:
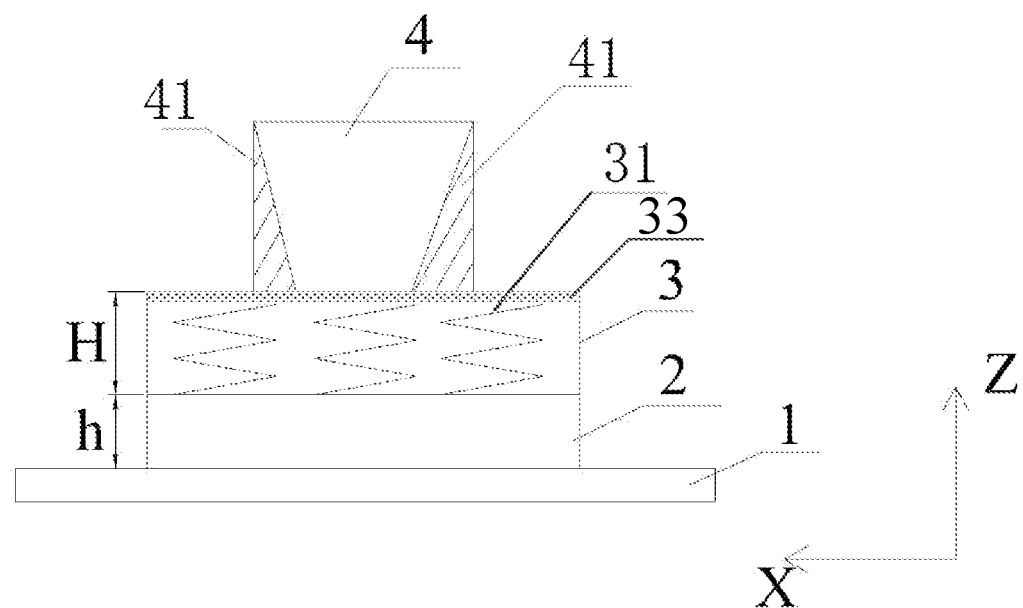

Refer to FIGS. 10a to 10b, which are schematic diagrams of the target object provided by an embodiment of the present disclosure. An adhesion support portion 2 with the first height value h is formed by spraying the model material layer by layer on the support platform 1 and superimposing layer by layer. In the embodiment, the model material and the support material can also be sprayed layer by layer at the same time to form a mixed material layer of the model material and the support material on the printed layer. Then, the model material is sprayed layer by layer on the adhesion support portion 2 to form the first elastic portion 31 and the support material is sprayed layer by layer at the same time to form the support main body. In an embodiment without a support top layer, an elastic support portion 3 with a second height value H is constituted by the first elastic portion 31 and the support main body. In an embodiment with a support top layer, an elastic support portion 3 with the second height value H is constituted by the first elastic portion 31, the support main body and the support top layer 33. Finally, the layers of the target object 4 are printed layer by layer on the elastic support 3 according to the printing data of the to-be-printed target object 4 to form the to-be-printed target object 4. Where the first height value h is less than the second height value H, and the first elastic portion 31 contacts with the topmost layer of the adhesion support portion 2. In the embodiment with a support top layer 33, the first elastic portion 31 does not contact with the formed to-be-printed target object 4, while the support top layer 33 contacts with the formed to-be-printed target object 4. The to-be-printed target object 4 in the embodiment may have a physical structure of the target object 4 as shown in FIG. 10*a*, or a combination of the physical structure as shown in FIG. 10*b* and the support structure 41. The inkjet printing method provided in the embodiment can effectively avoid the risk of a leveling component being damaged or the printed target object 4 being damaged and can effectively prevent the risk of cocking of the material layer during the inkjet printing process to facilitate the separation of the to-be-printed target object 4 from the support platform 1 after the printing is finished.

Figure 11:
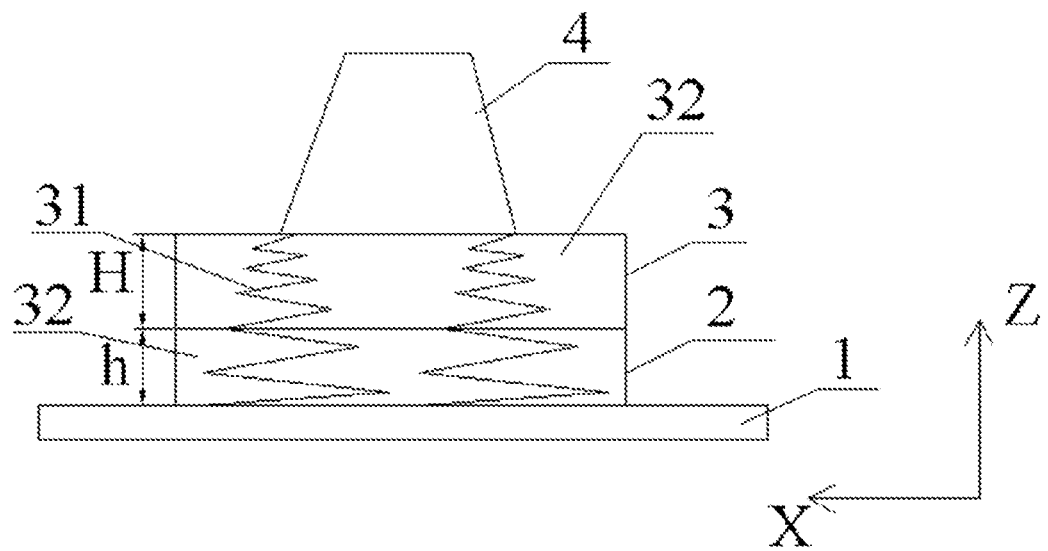
FIG. 11 is another optional structural schematic diagram formed by a three-dimensional object inkjet printing method provided by an embodiment of the present disclosure.

Cotinine to refer to FIG. 1, and refer to FIG. 11 at the same time, it is another optional structural schematic diagram formed by the three-dimensional object inkjet printing method provided by an embodiment of the present disclosure. The main difference between the embodiment and the foregoing embodiments is that the adhesion support portion 2 and the elastic support portion 3 in the foregoing embodiments are respectively formed by different materials. for example, the adhesion support portion 2 can be formed by spraying a model material or be formed by spraying a mixed material of a support material and a model material. The elastic support portion 3 includes a support main body 32 and a first elastic portion 31. The support main body 32 can be formed by spraying a support material, and the first elastic portion 31 can be formed by spraying the model material, and the adhesion support portion 2 and the elastic support portion 3 respectively have different functions during the formation of the three-dimensional object. The other optional implementation manners are applicable to the embodiment, and will not be repeated herein. In the embodiment, the material forming the adhesion support portion 2 in FIG. 11 is the same as the material forming the elastic support portion 3; the adhesion support portion 2 and the elastic support portion 3 both include a support main body 32 and a first elastic portion 31. The first elastic portion 31 is embedded in the adhesion support portion 2 and the elastic support portion 3, and the first elastic portion 31 abuts downward against the support platform 1. The first elastic portion 31 extends in the lamination direction of the support main body 32 and abuts upward against the to-be-printed target object 4 formed by printing and superimposing layer by layer on the elastic support portion 3. In the embodiment, the support main body may be formed by spraying the support material, or by spraying a mixed material of the model material and the support material, and the first elastic portion is formed by spraying the model material.

As an optional implementation manner, in the embodiment, the single first elastic portion extends in the lamination direction of the printed layers of the support main body, and voxels occupied in at least one printed layer and voxels occupied in other printed layers are different in number.

As another optional implementation manner, voxels occupied by the single first elastic portion in the printed layers in the lamination direction gradually decrease in number.

In the embodiment, the first elastic portion abuts downward against the support platform and abuts upward against the target object 4, which can increase the adhesive strength between the target object and the support platform, thereby effectively preventing the possibility of affecting the printing precision due to the separation of the material layer and the support platform during the printing process, especially when the contact surface of the first elastic portion abutting downward against the support platform (equivalent to the number of voxels occupied) is greater than the area (the number of voxels) occupied by the first elastic portion in other printed layers in the lamination direction, the adhesion between the target object and the support platform is more tight.

The material forming the adhesion support portion and the material forming the elastic support portion in the present disclosure may also be materials other than the materials disclosed in the above embodiments. For example, the material in the adhesion support portion and/or the elastic support portion is non-uniformly distributed, the specific performance of the material can be gradient or alternately changing.

Figure 12:
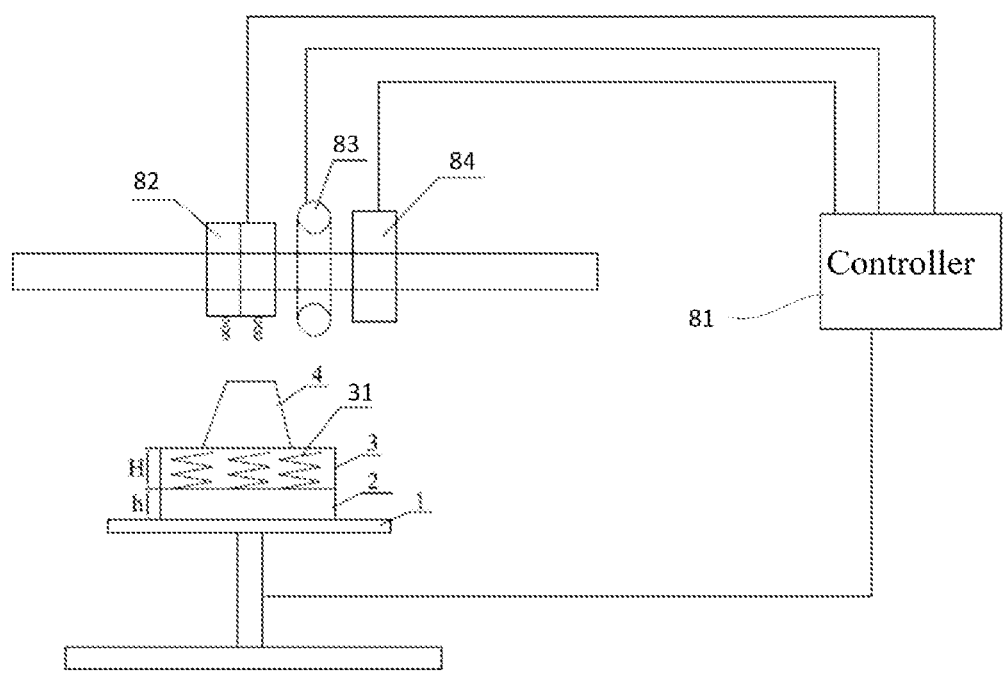
FIG. 12 is a structural schematic diagram of a printing apparatus provided by an embodiment of the present disclosure.

Refer to FIG. 12, which is a schematic structural diagram of a printing apparatus provided by an embodiment of the present disclosure. The printing apparatus as shown in FIG. 12 mainly includes: a print head 82, a support platform 1 and a controller 81. Where the controller 81 is configured to control the print head 82 to implement the three-dimensional object inkjet printing method described in any of the foregoing embodiments.

In the printing apparatus provided by the embodiment of the present disclosure, the adhesion support portion 2 is formed on the support platform 1 first, so that the adhesive support portion 2 and the structure thereon can be closely bound to the support platform 1, and then an elastic support portion 3 is formed on the adhesion support portion 2, which can be buffered by the elastic support portion 3 when it is subject to, for example, a leveling component 83; finally, the target object 4 is formed by printing layer by layer on the elastic support portion 3, thereby reducing a possibility of affecting the printing precision due to the separation of the material layer and the support platform 1, as well as reducing a possibility of cracking in a bottom of the support when subjected to an impact force during the inkjet printing process at the same time, and improving a printing reliability.

Optionally, the printing apparatus further includes a leveling component 83. The controller 81 is further configured to control the leveling component 83 to perform leveling processing on each printed layer of the target object 4. The leveling component 83 is configured to level the material layer. In the inkjet printing process using the inkjet printing apparatus in the embodiment, when the leveling component 83 suddenly hits the printed target object 4, the leveling component 83 is not easily damaged due to a buffering effect of the elastic support portion 3, and the printed target object 4 is not easily damaged, either, which further improves the printing success rate of the target object 4. Specifically, the leveling component 83 in the embodiment may be a leveling roller, and an excess material on the surface of the material layer is taken away by a rotation of the leveling roller to improve a surface accuracy of the material layer.

Optionally, the printing apparatus further includes a curing component 84. The controller 81 is further configured to control the curing component 84 to perform curing processing on the material sprayed by the print head 82. The inkjet printing apparatus in the embodiment further includes the curing component 84, the curing component 84 is configured to cure the material sprayed by the print head 82.

In some implementations, the model material and/or support material may be a photosensitive resin material, and the curing component 84 is a radiation source, such as an LED (light-emitting diode) light, a laser, and the like. By controlling the radiation source to radiate the material sprayed by the print head 82, the material undergoes a photo-curing reaction to form a cured material layer.

In other implementations, the model material and/or support material may be a temperature curing material, and the curing component 84 is a cooling source, such as a fan, and the like. By controlling the cooling source to cool down the material sprayed by the print head 82, the material undergoes solidification and curing to form a cured material layer.

Figure 13:
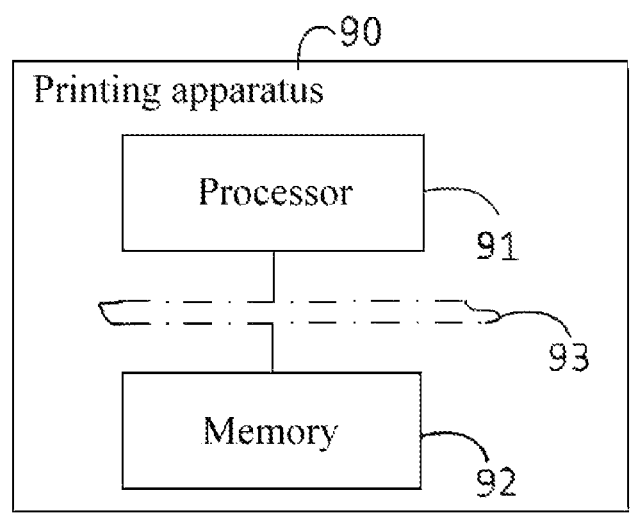
FIG. 13 is a schematic diagram of a hardware structure of a printing apparatus provided by an embodiment of the present disclosure.

Refer to FIG. 13, which is a schematic diagram of a hardware structure of the printing apparatus provided by an embodiment of the present disclosure. The printing apparatus 90 includes: a processor 91, a memory 92, and a computer program; where, the memory 92 is configured to store the computer program, the memory may also be a flash memory (flash). The computer program is, for example, an application program, a functional module, and the like that implements the above methods.

The processor 91 is configured to execute the computer program stored in the memory to implement steps executed by the printing apparatus in the above-mentioned three-dimensional object inkjet printing method. For details, reference may be made to the relevant description in the foregoing method embodiments.

Optionally, the memory 92 may be independent or integrated with the processor 91.

When the memory 92 is a device independent of the processor 91, the printing apparatus may further include:

a bus 93, configure to connect the memory 92 and the processor 91.

The present disclosure also provides a computer-readable storage medium, the computer-readable storage medium is stored with a computer program, the computer program is configured to implement, when executed by a processor, the three-dimensional object inkjet printing method provided by various embodiments described above.

The computer storage medium may be any available medium that can be accessed by a general-purpose or special-purpose computer. For example, a readable storage medium is coupled to the processor, so that the processor can read information from the readable storage medium and write information to the readable storage medium. Of course, the computer-readable storage medium may also be an integral part of the processor. The processor and the readable storage medium may be in an application specific integrated circuit (ASIC). In addition, the ASIC may be in a user equipment. Of course, the processor and the readable storage medium may also exist as a discrete component in a communication device. The readable storage medium may be a read only memory (ROM), a random-access memory (RAM), a CD-ROM (Compact disc read-only memory), a magnetic tape, a floppy disk, an optical data storage device, etc.

The present disclosure also provides a program product. The program product includes an execution instruction, and the execution instruction is stored in a readable storage medium. At least one processor of the device can read the execution instruction from the readable storage medium, and the execution of the execution instruction by the at least one processor causes the device to implement the methods provided in the foregoing various embodiments.

In the above embodiments of the printing apparatus, it should be understood that the processor may be a central processing unit (CPU), or other general-purpose processors or digital signal processors (DSP), an application specific integrated circuit (ASIC), etc. The general-purpose processor may be a microprocessor, or the processor may also be any conventional processor or the like. The steps of the method disclosed in combination with the present disclosure can be directly embodied as executed and completed by a hardware processor or executed and completed by a combination of hardware and software modules in the processor.

Finally, it should be noted that: the above various embodiments are merely used for illustrating the technical solutions of the present disclosure, but not being construed as limiting the present disclosure. Although the present disclosure is described in detail with reference to the forgoing embodiments, those skilled in the art should understand that modifications may still be made to the technical solutions of the forgoing various embodiments or equivalent replacements may be made to a part or all of the technical features therein. These modifications or replacements do not make the essence of corresponding technical solutions depart from the scope of the technical solutions of the embodiments of the present disclosure.

What is claim is:

1. A three-dimensional object inkjet printing method, comprising:
    forming an adhesion support portion on a support platform;
    forming an elastic support portion on the adhesion support portion, the elastic support portion being embedded with a first elastic portion; and
    forming a target object by printing layer by layer on the elastic support portion;
    wherein the forming the target object by printing layer by layer on the elastic support portion, comprising:
    spraying a first model material on the elastic support portion, and printing layer by layer to form the target object; and
    printing layer by layer on the elastic support portion to form a protection layer that at least partially wraps the target object;
    wherein the protection layer comprises a support layer in which an elastic extending portion is embedded; a material of the support layer comprises a support material, a material of the elastic extending portion comprises a second model material;
    wherein the first model material is the same as the second model material, or the first model material is different from the second model material.

2. The method according to claim 1, wherein a material for forming the adhesion support portion is different from a material for forming the elastic support portion;
    wherein the elastic support portion comprises: a support main body and the first elastic portion;
    the forming an elastic support portion on the adhesion support portion, comprising:
    printing layer by layer on the adhesion support portion to form the support main body and one or multiple first elastic portions embedded in the support main body, wherein the first elastic portion extends in a lamination direction of printed layers of the support main body and abuts downward against the adhesion support portion, and the multiple first elastic portions are uniformly distributed in each printed layer of the support main body.

3. The method according to claim 2, wherein the material of the support main body comprises the support material; and the material of the first elastic portion comprises the second model material.

4. The method according to claim 2, wherein each first elastic portion occupies a same area in each printed layer of the support main body.

5. The method according to claim 1, wherein a material for forming the adhesion support portion is the same as a material for forming the elastic support portion;
    wherein the first elastic portion is further embedded in the adhesion support portion.

6. The method according to claim 5, wherein the adhesion support portion and the elastic support portion both comprise: a support main body and the first elastic portion; and
the forming the adhesion support portion on the support platform, and forming the elastic support portion on the adhesion support portion, comprising:
printing layer by layer on the support platform to form the support main body and one or multiple first elastic portions embedded in the support main body, wherein the first elastic portion extends in a lamination direction of printed layers of the support main body and abuts downward against the support platform, and the multiple first elastic portions are uniformly distributed in each printed layer of the support main body.

7. The method according to claim 6, wherein a material of the support main body comprises the support material, or a mixed material of the second model material and the support material, and a material of the first elastic portion comprises the second model material.

8. The method according to claim 7, wherein each first elastic portion extends in the lamination direction of the printed layers of the support main body, and voxels occupied in at least one printed layer and voxels occupied in other printed layers are different in number.

9. The method according to claim 8, wherein voxels occupied by the each first elastic portion in the printed layers in the lamination direction gradually decrease in number.

10. The method according to claim 1, wherein the first elastic portion has a folded or curved shape in at least one plane perpendicular to the support platform.

11. The method according to claim 1, wherein the first elastic portion has a spiral shape.

12. The method according to claim 2, wherein the elastic support portion further comprises: a support top layer;
the forming an elastic support portion on the adhesion support portion, further comprising:
printing layer by layer on the support main body to form the support top layer; and
the forming a target object by printing layer by layer on the elastic support portion, comprising: printing layer by layer on the support top layer to form the target object.

13. The method according to claim 12, wherein the printing layer by layer on the support main body to form the support top layer, comprising:
spraying the support material on the support main body, and printing layer by layer to form the support top layer, wherein the support top layer covers at least a projection region of the target object on the support main body.

14. The method according to claim 13, wherein a coverage region of the support top layer on the support main body is the projection region of the target object on the support main body.

15. The method according to claim 2, wherein the forming an adhesion support portion on a support platform, comprising: spraying the second model material, or a mixed material of the support material and the second model material, on the support platform, and printing layer by layer to form the adhesion support portion.

16. The method according to claim 1, wherein the forming the adhesion support portion on a support platform, comprising:
forming an adhesion support portion having a light-absorbing color surface on the support platform.

17. The method according to claim 1, wherein
printing layer by layer on the support platform to form the protection layer that at least partially wraps the target object while printing layer by layer on the elastic support portion to form the protection layer.

18. The method according to claim 1, wherein the elastic extending portion is an extending part of the first elastic portion.

19. The method according to claim 17, wherein the protection layer further comprises a support layer in which a second elastic portion is embedded; a material of the support layer comprises the support material, a material of the second elastic portion comprises the second model material, and the elastic extending part is an extending part of the first elastic portion, and the second elastic portion abuts downward against the support platform.

20. The method according to claim 1, wherein a projection formed by the adhesion support portion on the support platform overlaps with a projection formed by the elastic support portion on the support platform, a projection formed by the target object on the support platform is within the projection formed by the adhesion support portion or the projection formed by the elastic support portion on the support platform, and shapes of the projections of the adhesion support portion, the elastic support portion and the target object are the same.

21. The method according to claim 1, wherein in a direction perpendicular to the support platform, a height of the adhesion support portion is smaller than a height of the elastic support portion.

22. A printing apparatus, comprises: a print head, a support platform, and a controller;
the controller is configured to control the print head to implement the three-dimensional object inkjet printing method according to claim 1.

23. The printing apparatus according to claim 22, further comprising: a leveling component;
the controller is further configured to control the leveling component to perform leveling processing to each printed layer of the target object.

24. The printing apparatus according to claim 22, further comprising: a curing component;
the controller is further configured to control the curing component to perform curing processing to a material sprayed by the print head.

25. A printing apparatus, comprising: a memory, a processor and a computer program, wherein the computer program is stored in the memory, and the processor runs the computer program to execute the three-dimensional object inkjet printing method according to claim 1.

* * * * *